United States Patent
Pragt et al.

[11] Patent Number: 6,137,089
[45] Date of Patent: Oct. 24, 2000

[54] HEATING ELEMENT

[75] Inventors: Johan Pragt, Boornbergum; Ronald Wijnsema, Growingen, both of Netherlands

[73] Assignee: U.S. Philips Corporation, New York, N.Y.

[21] Appl. No.: 08/891,602

[22] Filed: Jul. 11, 1997

[30] Foreign Application Priority Data

Jul. 15, 1996 [EP] European Pat. Off. .............. 96305176

[51] Int. Cl.[7] ..................................... F27D 11/00
[52] U.S. Cl. .......................... 219/438; 219/436; 219/543; 219/544
[58] Field of Search .................... 219/438, 436, 219/543, 544; 338/308, 309

[56] References Cited

U.S. PATENT DOCUMENTS

| | | | |
|---|---|---|---|
| 1,820,514 | 8/1931 | Waller | 219/438 |
| 2,945,114 | 7/1960 | Mathews | 219/43 |
| 3,127,300 | 3/1964 | Maggio | 159/32 |
| 3,196,253 | 7/1965 | Jepson | 219/436 |
| 3,505,498 | 4/1970 | Shevlin | 219/385 |
| 3,788,513 | 1/1974 | Racz | 220/64 |
| 3,806,701 | 4/1974 | Scott | 219/438 |
| 3,869,596 | 3/1975 | Howie | 219/438 |
| 3,909,591 | 9/1975 | Ulam | 219/438 |
| 3,971,361 | 7/1976 | Hurko | 126/390 |
| 4,031,353 | 6/1977 | Segura | 219/345 |
| 4,492,853 | 1/1985 | Lam | 219/432 |
| 4,493,978 | 1/1985 | Starnes | 219/438 |
| 4,680,452 | 7/1987 | Fischer | 219/449 |
| 4,715,269 | 12/1987 | Stoner | 99/279 |
| 5,189,947 | 3/1993 | Yim | 99/415 |
| 5,557,704 | 9/1996 | Dennis | 219/480 |
| 5,657,532 | 8/1997 | Alexander | 29/611 |

*Primary Examiner*—Teresa Walberg
*Assistant Examiner*—Daniel L. Robinson
*Attorney, Agent, or Firm*—Ernestine C. Bartlett

[57] ABSTRACT

A heating element comprises a thermally conductive substrate, an electrically insulating layer provided over the substrate, and a heating track deposited on the insulating layer. The heating element has a dished portion defining a concave face on one side of the element, the insulating layer and the heating track being provided on the concave face. The heating element is suitable for a range of liquid heating applications, including electric kettles.

22 Claims, 2 Drawing Sheets

HEATING ELEMENT

BACKGROUND OF THE INVENTION

This invention relates to electric heating elements, for example for use in liquid heating vessels such as kettles, rice cookers, coffee makers, etc.

Various types of heating elements are known for the above applications. Until recently, the most common form of heating element was the immersion element which basically comprises a metal coil which heats up when a current is passed through it.

Recently, there has been a tendency to produce flat heating elements. In the case of electric kettles, for example, these provide the advantage that cleaning the inside of a kettle is easier, and it may be possible to boil a smaller quantity of water, since a smaller quantity is required to cover the heating element. A flat heating element also provides improved appearance of the inside of the kettle.

One way to produce flat heating elements is simply to bond a conventional coil to the underside of a flat metal substrate. However, the use of thick film heating elements is now being explored for liquid heating applications. The invention concerns these thick film heating elements.

Conventionally, a thick film heating element comprises a planar metal substrate onto which an insulating dielectric layer is deposited, and a thick film heating track is patterned over the dielectric insulating layer. One problem associated with thick film heating elements is that difficulties arise in obtaining sufficiently high breakdown voltages for the heating elements. These are required so that the heating elements comply with the relevant industry standards. For example, the element may be subjected to a high voltage "flash test" before and after thermal tests, such as a boil-dry and a dry-boil test. During operation of the heating element, in the thermal tests described above as well as in normal operation of the element, thermal stresses cause micro-cracks to occur in the insulating layer. These cracks destroy the dielectric properties of the insulating layer and lead to reduced breakdown voltages. Efforts have been made to increase the breakdown voltage by improving the quality of the insulating layer.

SUMMARY OF THE INVENTION

According to the invention, there is provided a heating element comprising a thermally conductive substrate, an electrically insulating layer provided over the substrate, and a heating track deposited on the insulating layer, characterized in that the heating element has a dished portion defining a concave face on one side of the element, the insulating layer and heating track being provided on the concave face of the heating element.

The use of a dished shaped heating element, with the insulating layer and heating track provided on a concave face, ensures that the insulating layer is under a permanent state of compression, which has been found to improve resistance to the formation of micro-cracks.

Preferably, the substrate and insulating layer have substantially uniform depth across the heating element. This enables the substrate to be formed from a planar sheet of thermally conductive material, and then deformed into the desired shape.

The concave face preferably has a substantially uniform radius of curvature across the face. When the substrate comprises a circular plate, this radius of curvature may be greater than five times the diameter of the plate. In the case of a substrate having a 120 mm diameter, which is an appropriate size for a kettle element, this radius of curvature gives a deviation at the edge of the substrate of approximately 3 mm from a planar element. It has been found that a deflection of this order of magnitude is sufficient to improve the characteristics of the insulating layer.

Indeed, it is preferred that the radius of curvature is greater than ten times the diameter of the substrate.

Preferably, the substrate comprises a steel plate and the insulating layer comprises a porcelain enamel layer. The invention enables improved breakdown characteristics of the insulating layer, whether a ceramic or porcelain enamel layer is employed as the insulating layer.

The invention also provides a method of manufacturing a heating element comprising the steps of:

(i) providing a planar thermally conductive substrate;

(ii) deforming the substrate so as to provide a concave face on one side of the substrate;

(iii) providing an insulating layer over the substrate on the concave face of the substrate; and (iv) forming a heating track over the insulating layer.

BRIEF DESCRIPTION OF THE DRAWINGS

The invention will now be described by way of example, with reference to the accompanying drawings in which.

DESCRIPTION OF THE PREFERRED EMBODIMENTS

Figure 1:
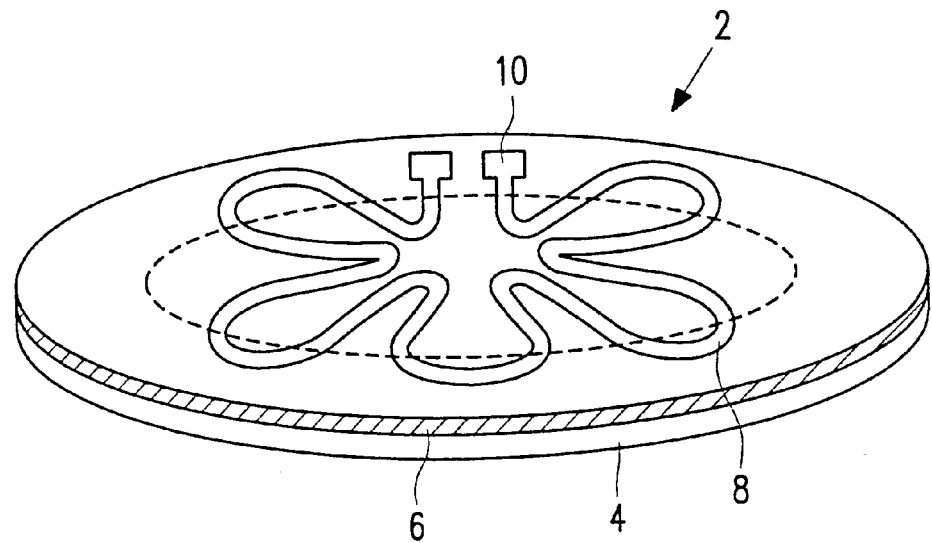
FIG. 1 shows a conventional heating element.

FIG. 1 shows a conventional flat heating element. The heating element 2 comprises a substrate 4 over which there is provided an insulating dielectric layer 6 and a heating track 8 on the insulating layer 6.

The substrate 4 comprises a plate of heat conductive material, such as steel or stainless steel. Stainless steel is, of course, preferred because the anti-corrosion benefits are useful for water heating applications. The substrate 4 is generally formed as a planar sheet of metal and may have any suitable shape. A circular element (particularly suitable for a kettle base) is shown in FIG. 1. The substrate 4 may have a thickness of approximately 1 mm which gives the heating element sufficient rigidity, while still allowing sufficient transfer of heat through the element (the liquid contacting the side of the substrate 4 opposite the heating track 8).

The insulating layer 6 may, for example, comprise a glass ceramic coating material. This may be applied by screen printing a powdered glass ceramic material to the substrate, and causing the material to crystallize through the application of heat. Heating the entire substrate enables the powdered coating to crystallize to form a continuous glass ceramic layer over one or both sides of the substrate, as desired. Typically, the insulating layer has a thickness of the order of 50 to 250 micrometers.

A large number of glass ceramic compositions will be known to those skilled in the art, and the choice of ceramic material for use as the insulating layer depends upon the desired characteristics of the layer, such as the dielectric constant, the breakdown voltage, the leakage current and the electrical resistance.

An alternative to the use of a glass ceramic dielectric coating is the use of a porcelain enamelled substrate. This involves fusing a vitreous glaze onto the metallic substrate by dipping, spraying or printing the substrate, and firing the coated substrate so that the enamel fuses to form a glass coating. Adherence of the enamel to the steel is improved by grit blasting the substrate before enamelling. The skilled addressee will also appreciate the various enamels and enamelling techniques that may be employed in the formation of a dielectric insulating layer.

The heating track 8 is formed on the insulating layer using a thick film technique. The heating track 8 comprises a resistance path connected between two terminals 10 which may be in any suitable shape. Shown in FIG. 1 is a crenellated resistance path to increase the length of the track. The heating track may comprise a number of parallel branches, and electronic controls may also be provided on the substrate, such as thick film thermistors for temperature regulation. The heating track 8 comprises, for example, a screen-printed paste which is fired to bond the track to the insulating layer 6. As will be appreciated by those skilled in the art, the resistivity and temperature coefficient of resistance of the material used are examples of important factors in determining the most appropriate thick film track to be employed. Silver palladium or nickel-based tracks are conventional in the art. The heating track 8 may typically have a thickness of 10 micrometers.

The components described above are all conventional in the art and any suitable combination of materials for the substrate 4, insulating layer 6 and track 8 may be employed in the heating element of the invention, which will now be described with reference to FIG. 2.

Figure 2:
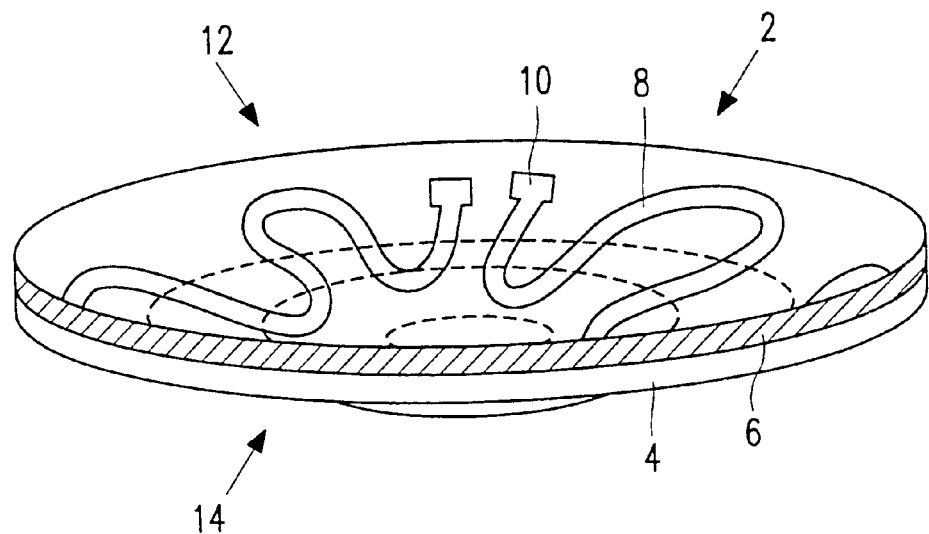
FIG. 2 shows a heating element according to the invention.

As shown in FIG. 2, the element 2 has a dished shape such that the element has a concave face 12 and a convex face 14.

The insulating layer 6 and heating track 8 is formed on the concave face 12 of the substrate 4, and it has been found that this gives rise to increased breakdown voltage of the dielectric layer 6. In other words, a higher voltage may be applied across the heating track 8 before the insulating layer 6 develops defects which can cause the resistance between the track 8 and the substrate 4 to be reduced.

It is believed that the improved breakdown characteristic of the heating element 2 is caused by the constant compression applied to the insulating layer 6 by virtue of the formation of the layer 6 on an inwardly curved surface. This curvature acts as a bias so that during use of the element, the deformation caused by heating of the substrate 4 (which is normally more pronounced in the center of the element than at the edges) follows the bias of the curvature. This maintains the insulating layer 6 under compression.

The curvature of the heating element 2 is exaggerated in FIG. 2 for the purposes of a clear representation. In fact, the amount of curvature of the element 2 may, for example give a deviation around the periphery of the element 2 from a flat plane (which contacts the centre of the element 2) of less than 1% of the diameter of the element 2. Thus, for an element of 120 mm diameter, the bend is preferably such as to cause deviation around the periphery of less than 1 mm. A large radius of curvature is preferred because the element may be used in applications where a flat element was previously used. Also, screen printing of the insulating layer and/or the heating track is no longer possible if the curvature of the element is too great. It has also been found that the advantages of the invention may be lost if the element has a sharp curvature, because the insulating layer and/or heating track can no longer be deposited evenly, which gives rise to hot-spots and local structural weaknesses.

For ease of manufacture, the element 2 preferably has a uniform radius of curvature across the surface of the elements. This radius of curvature will preferably be greater than five times the diameter of the element, and may be greater than ten times the diameter of the element 2. Thus, the element may be employed in all applications where a planar element would normally be employed, and without modification to the method of sealing the element into the respective heating vessel.

Figure 3:
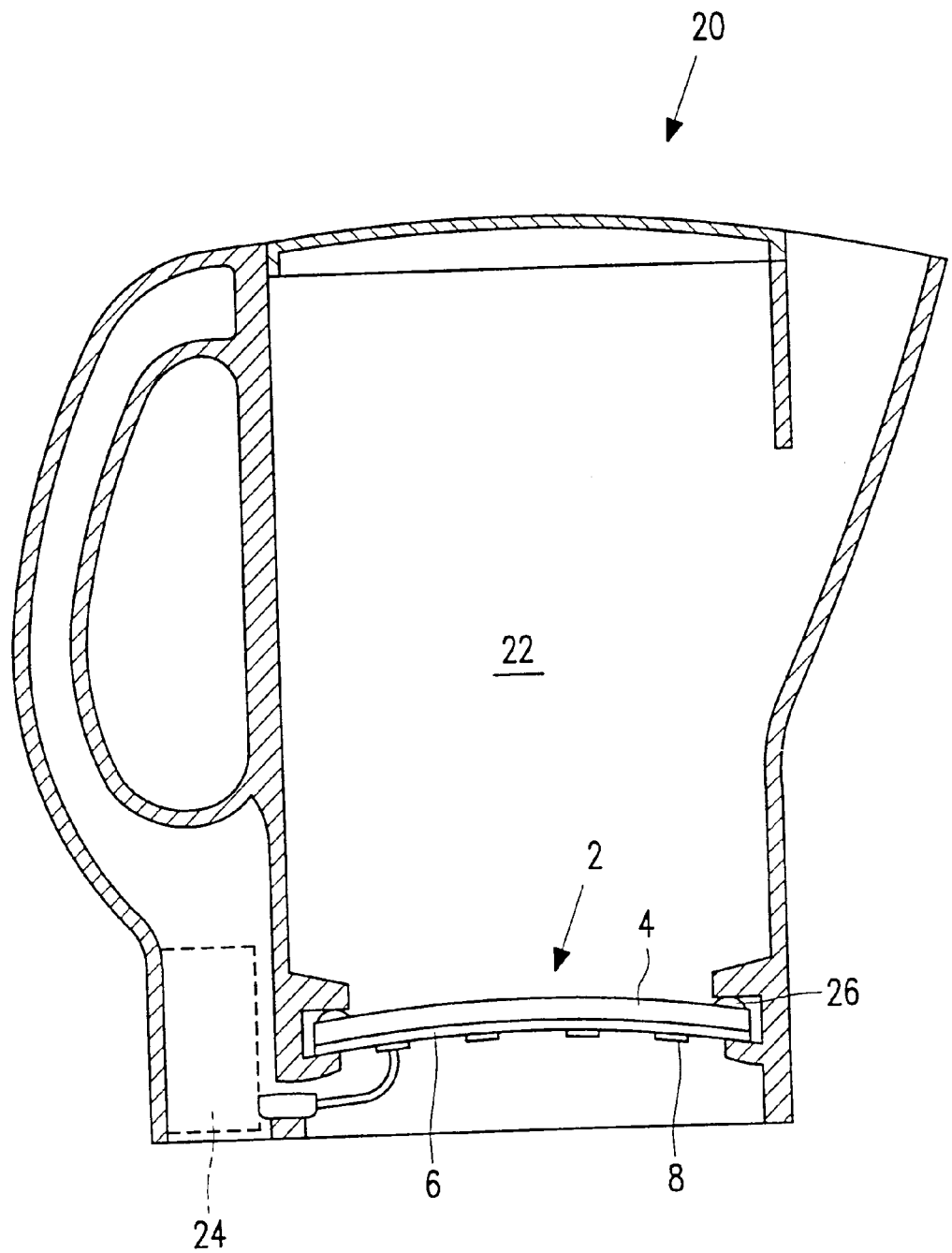
FIG. 3 shows a kettle provided with the heating element of FIG. 2.

FIG. 3 shows, in simplified form, a kettle employing the heating element shown in FIG. 2.

As is conventional, the heating element 2 is suspended in the base of the kettle 20 with the heating track 8 facing downwardly. During operation of the kettle, heat is transferred from the heating track 8 through the insulating layer 6 and the substrate 4 into the body 22 of the kettle 20. The kettle 20 includes a control unit 24 which may include a cordless or conventional connector, and which is coupled to the terminals 10 of the heating track 8.

The types of control which may be used in the kettle 20 do not affect the present invention and will not be described. Furthermore, the element 2 may be sealed in the base of the kettle 20 by a variety of known techniques, and a sealing member 26 is represented in FIG. 3. Again, the curvature of the heating element 2 is exaggerated in FIG. 3 for the purposes of a clear representation.

The curvature of the substrate 4 is provided before application of the insulating layer 6 and the heating track 8. For example, blanks may be formed after grit blasting of the steel (as described above), and these blanks may be shaped, for example, by die pressing. This pressing operation after grit blasting may also remove extreme surface unevenness resulting from the grit blasting, so as to improve adhesion of the insulating dielectric layer. Deforming the substrate before application of the insulating layer obviously avoids any damage being caused to the insulating layer and heating track, which are applied by the conventional techniques after deformation of the substrate 4. The substrate 4 may instead be a moulded article and may have varying thickness. This may be desirable if a particular configuration of the side of the substrate opposite the insulating layer 6 is desired. For example, with reference to FIG. 3, the upper surface of the heating element 2 may be maintained completely flat if this is desirable, or the upper surface may even have a concave face.

There are, of course, numerous heating applications to which the heating elements 2 of the invention may be put. Indeed, the invention may be applied to any known applications of thick film heating elements in order to improve the characteristics of the heating element.

From reading the present disclosure, other modifications will be apparent to persons skilled in the art. Such modifications may involve other features which are already known in the design and use of electrical or electronic circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention.

What is claimed is:

1. A heating element comprising a thermally conductive substrate, an electrically insulating layer provided over the substrate, and a heating track deposited on the insulating layer, wherein the heating element has a dished portion defining a concave face on one side of the element, the insulating layer and heating track being provided on the concave face of the heating element.

2. A heating element as claimed in claim 1, wherein the substrate and the insulating layer have substantially uniform depth across the heating element.

3. A heating element as claimed in claim 1, wherein the concave face has substantially uniform radius of curvature across the face.

4. A heating element as claimed in claim 3, wherein the substrate is substantially circular, and the radius of curvature of the concave face is greater than five times the diameter of the substrate.

5. A heating element as claimed in claim 4, wherein the radius of curvature of the concave face is greater than ten times the diameter of the substrate.

6. A heating element as claimed in claim 1, wherein the substrate comprises a steel plate, and the insulating layer comprises a porcelain enamel layer.

7. An electric kettle including a heating element as claimed in claim 1.

8. A heating element as claimed in claim 2, wherein the substrate comprises a steel plate, and the insulating layer comprises a porcelain enamel layer.

9. A heating element as claimed in claim 3, wherein the substrate comprises a steel plate, and the insulating layer comprises a porcelain enamel layer.

10. A heating element as claimed in claim 4, wherein the substrate comprises a steel plate, and the insulating layer comprises a porcelain enamel layer.

11. A heating element as claimed in claim 5, wherein the substrate comprises a steel plate, and the insulating layer comprises a porcelain enamel layer.

12. An electric kettle including a heating element as claimed in claim 2.

13. An electric kettle including a heating element as claimed in claim 3.

14. An electric kettle including a heating element as claimed in claim 4.

15. An electric kettle including a heating element as claimed in claim 5.

16. An electric kettle including a heating element as claimed in claim 6.

17. A substantially flat heating element comprising a substantially flat thermally conductive substrate, an electrically insulating layer provided over the substrate, and a heating track comprising a thick film deposited on the insulating layer, wherein the heating element has a dished portion defining a concave face on one side of the element, the insulating layer and heating track being provided on the concave face of the heating element, and wherein the insulating layer of said heating element exhibits an increased breakdown voltage compared to the breakdown voltage obtained when said heating element is not provided on said concave face.

18. A heating element as claimed in claim 17, wherein the substrate and the insulating layer have substantially uniform depth across the heating element.

19. A heating element as claimed in claim 17, wherein the concave face has a substantially uniform radius of curvature across the face.

20. A method of manufacturing a substantially flat heating element comprising the steps of:
  (i) providing a planar thermally conductive substrate;
  (ii) deforming the substrate so as to provide a concave face on one side of the substantially flat substrate;
  (iii) providing an insulating layer over the substrate on the concave face of the substrate; and
  (iv) forming a heating track comprising a thick film deposited on the insulating layer, the insulating layer and heating track being provided on the concave face, the insulating layer of said heating element exhibiting an increased breakdown voltage compared to the breakdown voltage obtained when said heating element is not formed on said concave face.

21. An electric kettle including a heating element as claimed in claim 17.

22. A method of manufacturing a heating element comprising the steps of:
  (i) providing a planar thermally conductive substrate;
  (ii) deforming the substrate so as to provide a concave face on one side of the substrate;
  (iii) providing an insulating layer over the substrate on the concave face of the substrate; and
  (iv) forming a heating track over the insulating layer.

* * * * *